United States Patent [19]
Bradburn et al.

[11] Patent Number: 5,575,239
[45] Date of Patent: Nov. 19, 1996

[54] INDOOR/OUTDOOR ANIMAL HOUSING

[75] Inventors: Thomas A. Bradburn; Richard K. Garton; Richard N. Sauerwein, all of Fort Wayne, India.

[73] Assignee: Fort Wayne Plastics, Inc., Fort Wayne, India.

[21] Appl. No.: 430,332

[22] Filed: Apr. 28, 1995

[51] Int. Cl.$^6$ .............................. A01K 1/02; A01K 1/035
[52] U.S. Cl. ........................... 119/500; 119/484; 119/501
[58] Field of Search .............................. 119/19, 105, 15, 119/16, 21, 61, 163; 160/184, 332, 416, 439, 482

[56] References Cited

U.S. PATENT DOCUMENTS

| | | |
|---|---|---|
| Des. 218,902 | 10/1970 | Kelley . |
| Des. 244,172 | 5/1977 | Lee . |
| Des. 288,733 | 3/1987 | Welker . |
| Des. 327,143 | 6/1992 | Dickinson . |
| Des. 334,634 | 4/1993 | Greitzer . |
| 920,975 | 5/1909 | Minion . |
| 1,047,561 | 12/1912 | Petersen . |
| 2,009,758 | 7/1935 | Blatchford . |
| 2,772,660 | 12/1954 | Saul .......................................... 119/61 |
| 2,987,043 | 6/1961 | Spindler . |
| 3,377,990 | 4/1968 | Mitchell ................................. 119/165 |
| 3,413,958 | 12/1968 | Artig ........................................ 119/15 |
| 3,710,761 | 1/1973 | Gregory . |
| 3,771,686 | 11/1973 | Brinson ................................ 119/19 X |
| 3,793,989 | 2/1974 | Clark . |
| 4,201,153 | 5/1980 | Nace ..................................... 119/15 X |
| 4,295,446 | 10/1981 | Voss . |
| 4,367,781 | 1/1983 | Vallieres, Jr. et al. .................. 160/332 |
| 4,640,228 | 2/1987 | Sedlacek et al. ......................... 119/15 |
| 5,081,956 | 1/1992 | Greitzer et al. . |
| 5,406,909 | 4/1995 | Wenstrand .............................. 119/61 |
| 5,462,015 | 10/1995 | Murphy .................................. 119/19 |
| 5,465,682 | 11/1995 | Chavallo, Jr. ............................ 119/19 |

OTHER PUBLICATIONS

Printed publication dated Feb. 4, 1987—specifically, an advertisement by Canine Castle Company.

*Primary Examiner*—Robert P. Swiatek
*Assistant Examiner*—Yvonne R. Abbott
*Attorney, Agent, or Firm*—Woodard, Emhardt, Naughton, Moriarty & McNett

[57] ABSTRACT

An improved indoor/outdoor doghouse having the improved connection of a top portion and a base portion of an animal housing using press-fit attachment members. Two types of press-fit attachment pairs are described with a first member of each pair being integral with the base portion and a second member of each pair being integral with the top portion. Another aspect of the present invention employs interior staking to secure the animal shelter to the ground. This feature employs a stake through an opening in an interior floor surface. In yet another aspect of the present invention, a floor channel is employed with a raised portion of the floor to hold water introduced by a wet animal occupying the shelter. The channel can be formed in any portion of the floor, or, alternatively, can follow a path between one or more walls of the enclosure and the raised portion. The present invention employs a louvered vent in a wall of the shelter to improve ventilation, but avoid the entry of rain therethrough.

39 Claims, 8 Drawing Sheets

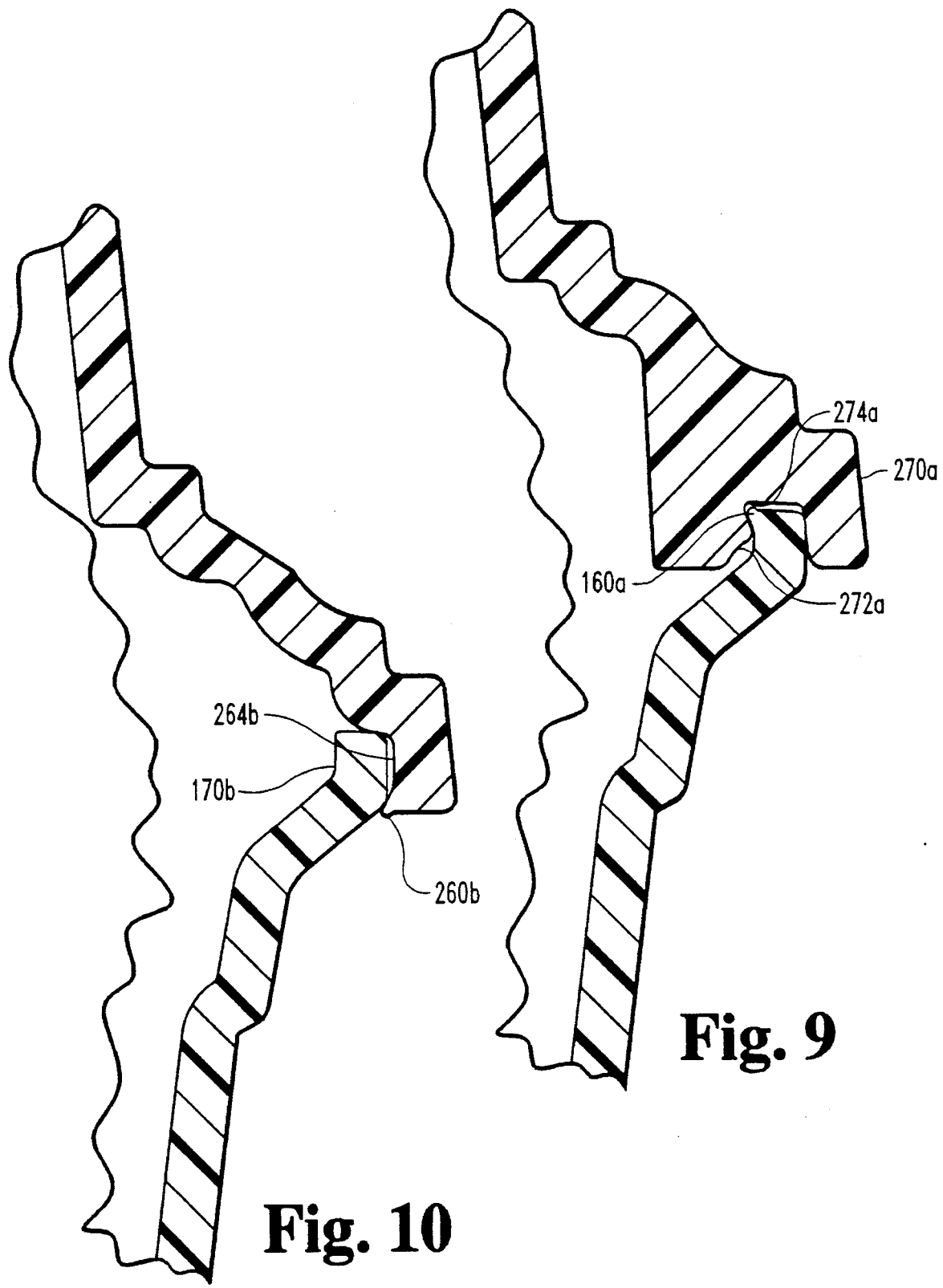

INDOOR/OUTDOOR ANIMAL HOUSING

BACKGROUND OF THE INVENTION

Many types of animal shelters or housings exist for both indoor and outdoor use. Prior shelters have been known which include features such as floor drains, exterior hold-down stakes, multi-channel ventilation or liberal use of thermoplastic construction materials.

One prior improvement is the use of a two piece thermoplastic molded design generally configured as a top roof portion and a base portion. Often, these pieces are designed to permit the roof portion, in an inverted position, to nest within the base portion for ease of storage and transport. Unfortunately, two piece plastic shelters often use external latching methods to connect the two pieces together. This extra hardware increases cost of the shelter and complicates the assembly process.

Other aspects of existing patents for animal shelters include exterior stakes to hold the shelter in place. However, external hold-down stakes also present some disadvantages. For example, the stakes can be cumbersome to navigate around and may even pose a tripping hazard. Furthermore, external stakes add to the effective surface area taken up by the shelter without increasing the usable space. Although a heavier weight shelter may be less likely to be overturned or dislocated under windy conditions, a heavier shelter would be more difficult to move and more expensive to transport. Thus, a better way of fixing a light-weight shelter to the ground is needed.

Another possible feature is a floor drain. However, if a shelter with a floor drain is placed on soggy or low lying ground, these drains may actually allow water to enter into the shelter instead of draining water away from a wet animal occupying it. Therefore, one needed improvement is a way to drain off water which an animal brings inside the shelter, but at the same time prevent the encroachment of water from low lying or soggy areas.

Some shelters resort to sophisticated multi-channel ventilation techniques by molding additional walls to provide rain-free air vents. One example is U.S. Pat. No. 5,081,956 to Greitzer et al. Unfortunately, the special shaping of the walls prevents nesting of the roof portion in an inverted position inside the base portion due to the peculiar wall shape. Thus, a rain-free cross-ventilation system which still permits nesting of the roof portion in the base piece for storage and transportation is needed.

Consequently, a new design for an animal shelter is needed which may be used indoors or outdoors. This design should facilitate connection of a plastic molded roof or top portion to a base portion without additional hardware. Also, this new shelter should provide for a new type of hold-down staking that does not pose a hazard or occupy unnecessary space. In addition, a way to drain water from wet animals occupying the shelter without facilitating the inflow of water is desirable. Finally, a cross-ventilation system that prevents the entry of precipitation but still allows for nesting of the roof or top portion in an inverted position in the base portion is also desirable.

SUMMARY OF THE INVENTION

The present invention offers several improvements to indoor/outdoor animal housings or shelters. One aspect of the invention is the use of press-fit attachment members to connect portions of the housing enclosure without the need for additional hardware. For example, an animal housing comprising a hollow base portion having a lower rim and a hollow top portion having an upper rim configured to align with the lower rim can be connected by a pair of press-fit attachment members to form the enclosure. The first member of this pair is integrally formed on the base portion and a corresponding second member of the pair is integrally formed on the top portion. The pair is connected by pressing the top portion and the base portion together. Preferably, the housing is comprised of a thermoplastic, but other materials are also envisioned.

In one embodiment, the press-fit attachment pair has a first member which is a lip outwardly extending from the lower rim. The corresponding second member is a tab inwardly extending from the upper rim defining a notch configured to receive the lip for interlocking engagement. In a variation of this embodiment, several press-fit attachment pairs might be employed by spacing inwardly extending tabs along the upper rim for interlocking engagement with a portion of a continuous lip extending from the lower rim.

In another embodiment, the press-fit attachment pair has a first member which is a tab inwardly extending from the lower rim. The corresponding second member is a finger extending downward, and having an outward surface defining a groove configured to receive the tab for interlocking engagement. One or more of this type of press-fit attachment pair might be employed. Moreover, this type of pair may be employed in combination with other types of press-fit attachment pairs to provide a connection scheme for the animal housing without the need of additional bolts, buckles or other connecting hardware.

In another aspect of the invention, the animal housing employs an internal or interior stake feature. This feature securely fastens an animal housing to the ground without the hazards or extra space occupied by external stakes. The animal housing floor includes an interior surface formed approximately parallel to the ground and this surface defines an opening therethrough. This opening is configured to allow a stake to pass through the opening and into the ground. The stake includes a head to hold the floor in place once the stake is secured in the ground. More than one opening and corresponding stake are envisioned for the present invention. In addition, in one preferred embodiment, the opening has a recess to accommodate the head so that the stake mounts flush to the floor. Alternatively, the recessed opening can be covered by a plug configured to fit in the opening flush with the floor. This plug accommodates placement of the animal shelter on a surface which does not permit engagement by a stake, such as a concrete or wooden floor.

In a further aspect of the invention, the floor includes a drainage channel to hold water introduced by a wet animal without the problems resulting from a common floor drain. For this improvement, the floor of the animal housing is formed from a thermoplastic material and includes a raised portion having an upward surface elevated above the ground and a channel adjacent the raised portion. In one preferred embodiment, this upper surface of the raised portion is formed in the shape of a dome. This crowning of the raised floor portion facilitates drainage of water from the raised floor portion into the adjacent channel.

In one configuration, the channel is integrally molded between the raised portion and a wall of the housing. The channel may follow a path between the floor and a wall for only the length of one wall or, alternatively, the channel may follow a path for more than one wall. In another variation, the channel circumscribes the raised portion. In addition, it should be noted that the raised floor portion also provides thermal insulation from the ground.

In one embodiment the raised floor portion is supported by ribs. The ribs strengthen the raised portion of the floor and minimize flexture of the floor from the weight of an animal occupying the shelter. In addition, the ribs may be designed so that the shelter is more easily leveled when the shelter is situated on uneven earth. Specifically, when the shelter is placed on earth with surface irregularities, the ribs variously penetrate the earth to effectively absorb these irregularities and provide a stable and even resting position.

In another aspect of the invention, the animal housing includes a louvered vent to provide cross-ventilation and still prevent entry of rain water. It is envisioned that the enclosure has a first wall being formed from a thermoplastic material and an openable roof. The first wall has an outer surface exposed to the out-of-doors environment and an inner surface opposite the outer surface, adjacent the interior of the enclosure. The first wall defines a louvered vent therethrough having a plurality of approximately parallel vanes. Each vane has an upper surface slanted downward toward the outer surface. The upper surfaces shed water to the exterior of the vent while the openings between the vanes permit an exchange of air.

An openable roof could be a top portion configured as a roof which is connected by press-fit attachment pairs to a base portion. Alternatively, an openable roof may be formed by a hinge connection of the roof to form an enclosure either separately or in tandem with press-fit attachment pairs.

Other aspects of the animal shelter are the doorway and door in combination with the aforementioned improvements. The doorway preferably includes a raised lip to prevent the entry of water flowing on the ground. Similarly, the door has a covered entry to impede the entry of rain. In one embodiment, the door is comprised of a plurality of flexible plastic strips. The upper portion of each strip is interconnected to form a unitary piece. The unitary piece defines a circular hole between each pair of adjacent strips just below the interconnection of the strips.

Furthermore, the present invention contemplates the nesting of the top portion and base portion to facilitate storage and transportation in combination with the aforementioned improvements. Specifically, the top portion has a closed end opposite an open end which is bordered by the upper rim. The base portion defines a chamber configured to receive a substantial part of the top portion when the closed end of the top portion enters the chamber first, whereby the top portion is nestable within said base portion for storage purposes.

BRIEF DESCRIPTION OF THE DRAWINGS

FIG. 2a is a perspective view of the base portion of the embodiment of the present invention shown in FIG. 1.

FIG. 2b is an elevational view of one embodiment of a hold-down stake for use with the embodiment shown in FIG. 2a.

FIG. 2c is a cross-sectional view of the hold-down stake shown in FIG. 2b.

FIG. 2d is an elevational view of a plug for use in one embodiment of the present invention.

FIG. 9 is a partial cross-sectional view of one type of press-fit attachment pair shown in FIG. 8.

FIG. 10 is a partial cross-sectional view of another type of press-fit attachment pair shown in FIG. 8.

DESCRIPTION OF THE PREFERRED EMBODIMENT

Figure 1:
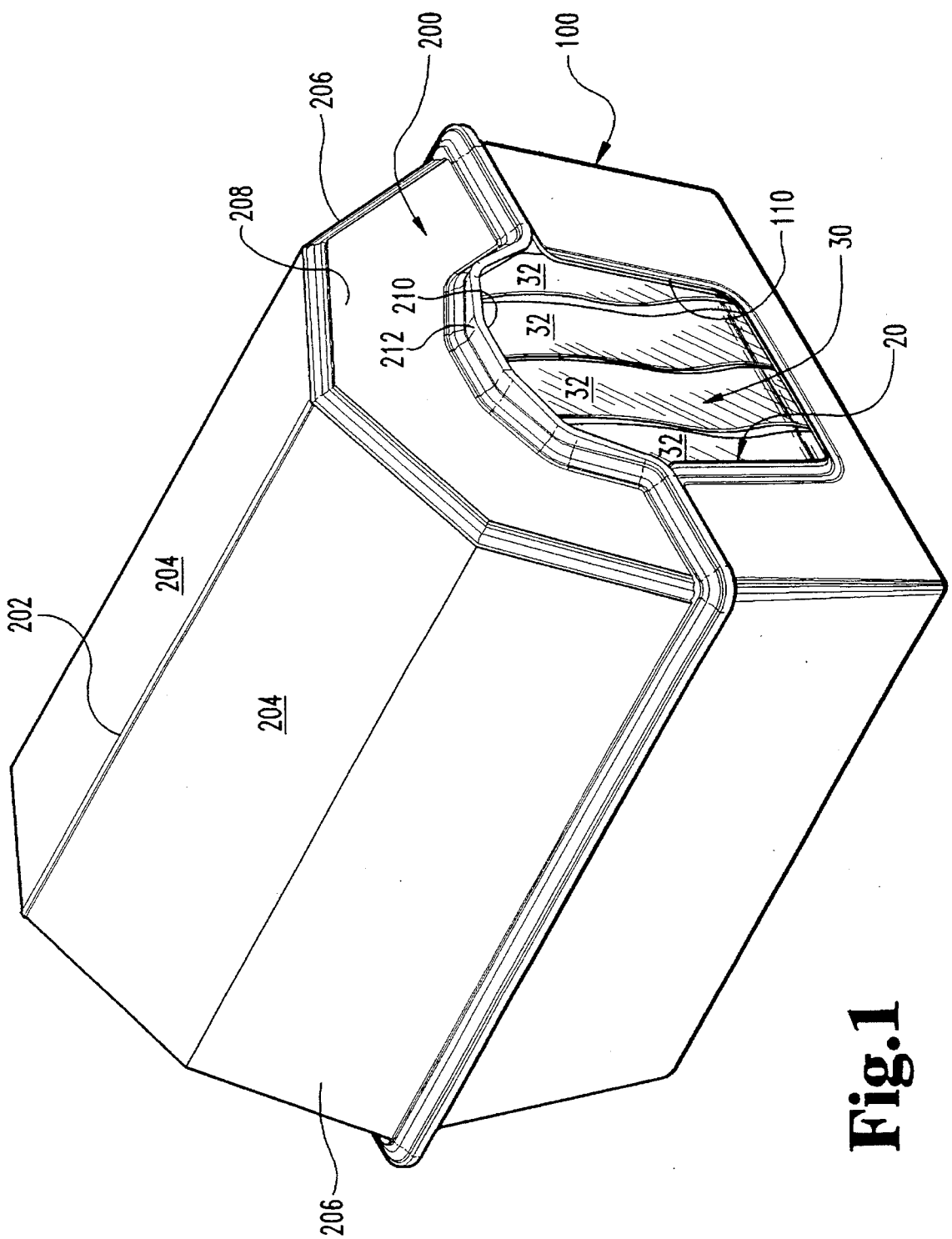
FIG. 1 is a perspective view of one embodiment of the present invention.

For the purposes of promoting an understanding of the principles of the present invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention combines several useful features in an indoor/outdoor animal housing or shelter that may be used for dogs and similar animals. Referring to FIG. 1, one embodiment of the present invention is shown as animal shelter 10. Animal shelter 10 is an enclosure formed by attachment of a hollow base portion 100 to a hollow top portion 200. Base portion 100 and top portion 200 are preferably molded from a thermoplastic material suitable for indoor or outdoor use. Other materials as would occur to one of ordinary skill in the art are also contemplated.

Several improvements of the present invention are disclosed in connection with base portion 100. Referring to FIG. 2a, base portion 100 is designed to rest on the ground and is preferably molded from a single piece of material. The base portion 100 has a lower rim 150 defining an open base end 152 which is generally opposite the floor 120 of base portion 100. Base portion 100 includes side walls 102, rear base wall 104 and front base wall 106. Front base wall 106 defines a base doorway perimeter 110. Preferably, the base doorway perimeter 110 is configured to provide a raised doorway lip 112 to prevent the encroachment of water flowing along the ground. However, the doorway lip 112 should be designed so as not to impede entry of animals which will use the shelter. Although FIG. 2a shows a base portion 100 comprised of four adjoining walls, any number of distinct walls could be employed. Indeed, a solitary arcuate wall used in igloo-shaped animal shelters could also be used to practice the present invention.

A floor 120 is integrally connected on each of four sides 122 to the side walls 102, rear base wall 104 and front base wall 106 of base portion 100. This floor 120 may be molded as part of a single piece base portion 100 or configured separately.

The interior surface 124 of floor 120 is formed to be approximately parallel to the ground when the animal shelter 10 is configured for use by an animal. Interior surface 124 defines two openings 126. Each opening 126 is configured to receive a hold-down stake, such as stake 50 shown in FIGS. 2b and 2c, to securely fasten the shelter 10 to the ground. Preferably, the interior surface 124 defines a recess 127 adjacent stake opening 126. It is envisioned that other embodiments may employ more or less than two interior stake openings 126 with corresponding stakes 50.

Referring specifically to FIG. 2b, one embodiment of stake 50 is depicted. Stake 50 has a head 52 with a shoulder 54 configured to engage opening 126 and recess 127, respectively, to mount flush with the interior surface 124 in the vicinity of the stake head 52. The head 52 is integrally connected to an elongate body 58. Opposite head 52 along the elongate body 58 is a penetrating point 56. Referring to FIG. 2c, a "T-shaped" cross-section of the elongate body 58 is illustrated. Besides the stake 50 configuration, it is contemplated that stakes of various lengths and configurations may be used to accommodate different soil and ground compositions.

Animal shelter 10 with floor 120 is held securely to the ground by passing the penetrating point 56 through the opening 126 and penetrating the ground. The stake 50 is driven or pushed into the ground until the shoulder 54 of head 50 engages the recess 127 of opening 126. The head 50 exerts a downward force against the recess 127 of the floor 120 holding the floor 120 next to the ground as long as the stake remains securely fixed in the ground.

Referring next to FIG. 2d, a plug 60 for use in place of stake 50 is shown. Plug 60 has a head 62 with a shoulder 64 configured to engage opening 126 and recess 127. Plug 60 mounts flush with floor 120 to conveniently close the opening for the comfort of an occupying animal. Plug 60 is particularly useful to accommodate placement of the animal shelter on a surface which does not permit engagement by a stake, such as a concrete or wooden surface.

Referring back to FIG. 2a, another feature of floor 120 is the channel 128 circumscribing the raised floor portion 130. Preferably channel 128 is integrally formed along each side of floor 120 between raised floor portion 130 and an adjacent wall of the base portion 100. Channel 128 provides a drainage trough to hold water which is inadvertently introduced to the interior of the enclosure, such as when a wet animal enters the shelter 10. As a result, the upward surface 132 of the raised floor portion 130 remains relatively dry because of the water shedding capability of the channel 128. In one preferred embodiment, the raised floor portion 130 is slightly dome-shaped. This dome-shaped or "crowned" floor facilitates drainage of water from the upper surface 132 into the adjacent channel 128.

In still other embodiments, the channel 128 can be formed in another portion of the floor. Alternatively, besides circumscribing the raised floor portion 130, the channel 128 may be formed between less than all the walls of the enclosure and the raised portion 130.

Figure 3:
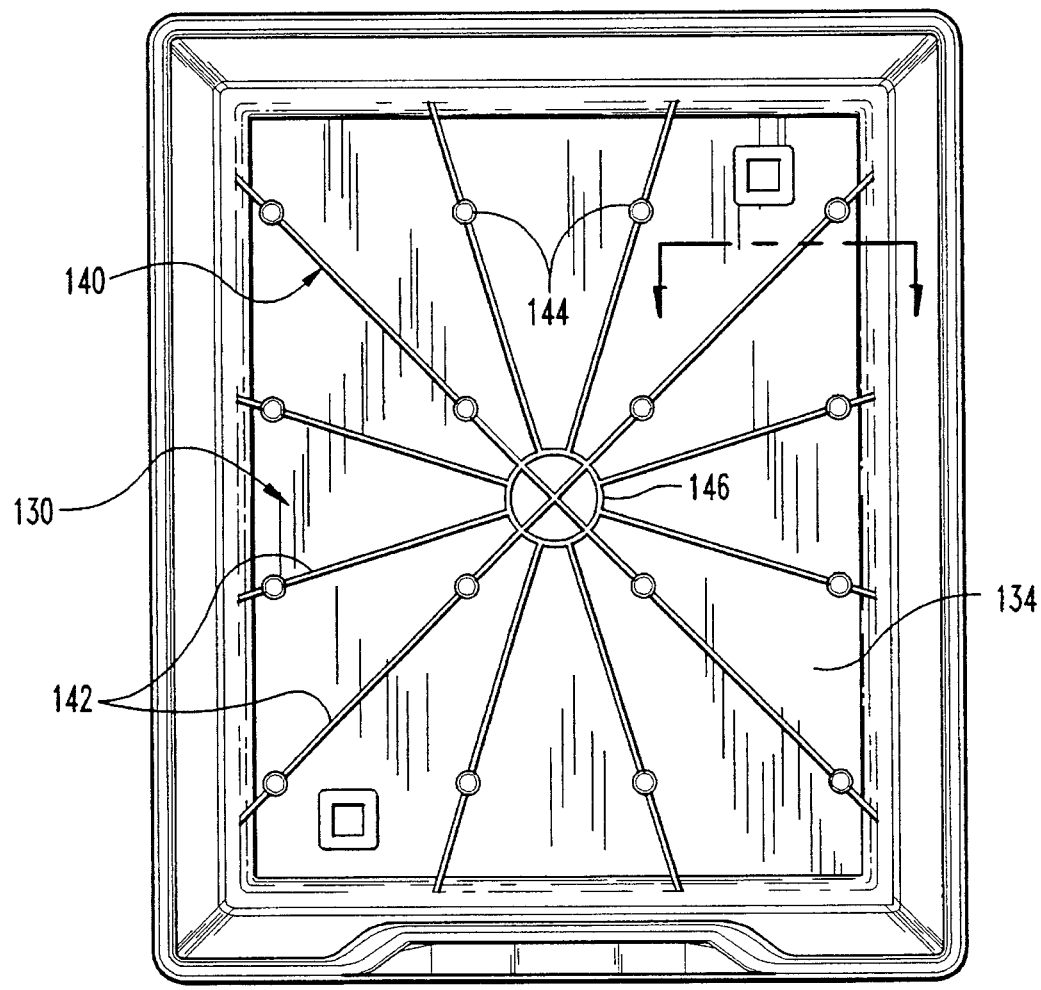
FIG. 3 is a plan view of the bottom of the base portion shown in FIG. 2.

Referring to FIG. 3, yet another feature of the base portion floor 120 is revealed. FIG. 3 is a plan view of the underside of the base portion 100 revealing a support structure 140 for the raised floor portion 130. Attached to the downward surface 134 of raised floor portion 130 are a number of support ribs 142 extending radially from approximately the center of raised floor portion 130 to channel 128. The support ribs 142 are shown with a number of support cylinders 144 and a support ring 146 which together comprise the support structure 140 attached to the underside of raised floor portion 130. Alternatively, various other rib patterns and combinations of supporting structures are contemplated.

Figure 4:
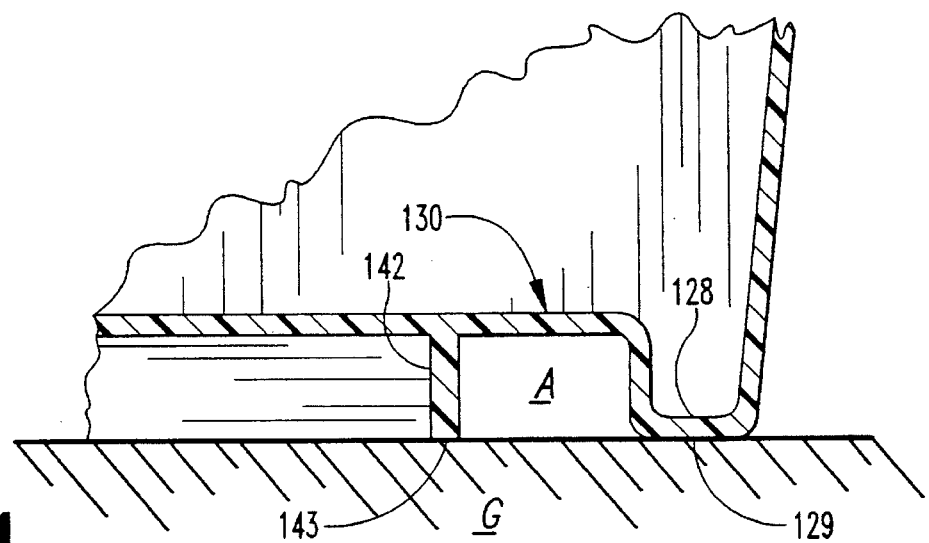
FIG. 4 is a partial cross-sectional view of the channel and support rib configuration shown in FIG. 3.

Referring to FIG. 4, a cross-section of a portion of FIG. 3, the support rib 142 projects generally perpendicular from downward surface 134 so that the base 143 of support rib 142 is about vertically even with the bottom surface 129 of channel 128. Similarly, the base of support cylinders 144 and the support ring 146 extend downward to be approximately vertically even with bottom surface 129. Together, bottom surface 129 and support structure 140 comprise the contact points of base portion 100 used to contact with the ground, G.

It will be appreciated that the support structure 140 permits the raised floor portion to be made from a relatively thin material which would ordinarily deform under the weight of a sheltered animal were it not for the additional strength offered by the support structure 140. Moreover, this configuration avoids the added weight resulting from a raised floor portion manufactured as a solid piece of like material. It can also be appreciated that this support structure 140 creates "dead-air" pockets such as air pocket A shown in FIG. 4. These air pockets serve as an insulator to prevent the loss of heat from a sheltered animal through the ground.

The internal floor stake feature, drainage trough channel feature and raised floor portion support structure can be incorporated into a single-piece enclosure as well as an enclosure formed by attachment of a base portion 100 to a top portion 200. Furthermore, in alternative embodiments, the internal floor stake feature, the drainage channel and raised floor portion may not be combined, but rather may be employed separately, without the other features. Alternatively, other embodiments of the present invention need not include a floor in the base portion at all.

Referring back to FIG. 1, features of the top portion 200 are further described. Preferably, top portion 200 is molded as a single piece from a thermoplastic. Also, it can be appreciated that top portion 100 is configured as a roof to shed water having upper sloped surfaces 204 meet to form an apex at a closed end 202. Also, in that particular embodiment, each upper sloped surface 204 is attached to a lower sloped surface 206 which have a slightly different angle of slope. Similarly, additional sloped surfaces may be employed or a curved surface of continually changing slope may also be used, or any combination thereof, which would serve as a roof capable of shedding water. Furthermore, it can be appreciated that lower sloped surfaces 206 of the roof configuration of top portion 100 overhang the base portion 200 so that water flowing off the roof is not directed into the base portion 200.

Top portion 200 also has a front top wall 208 attached to sloped surfaces 204 and 206 and defining the top doorway perimeter 210. The upper portion of the top doorway perimeter 210 preferably extends outward to form an entry cover 212 which impedes the entry of rain through the doorway.

Figure 5:
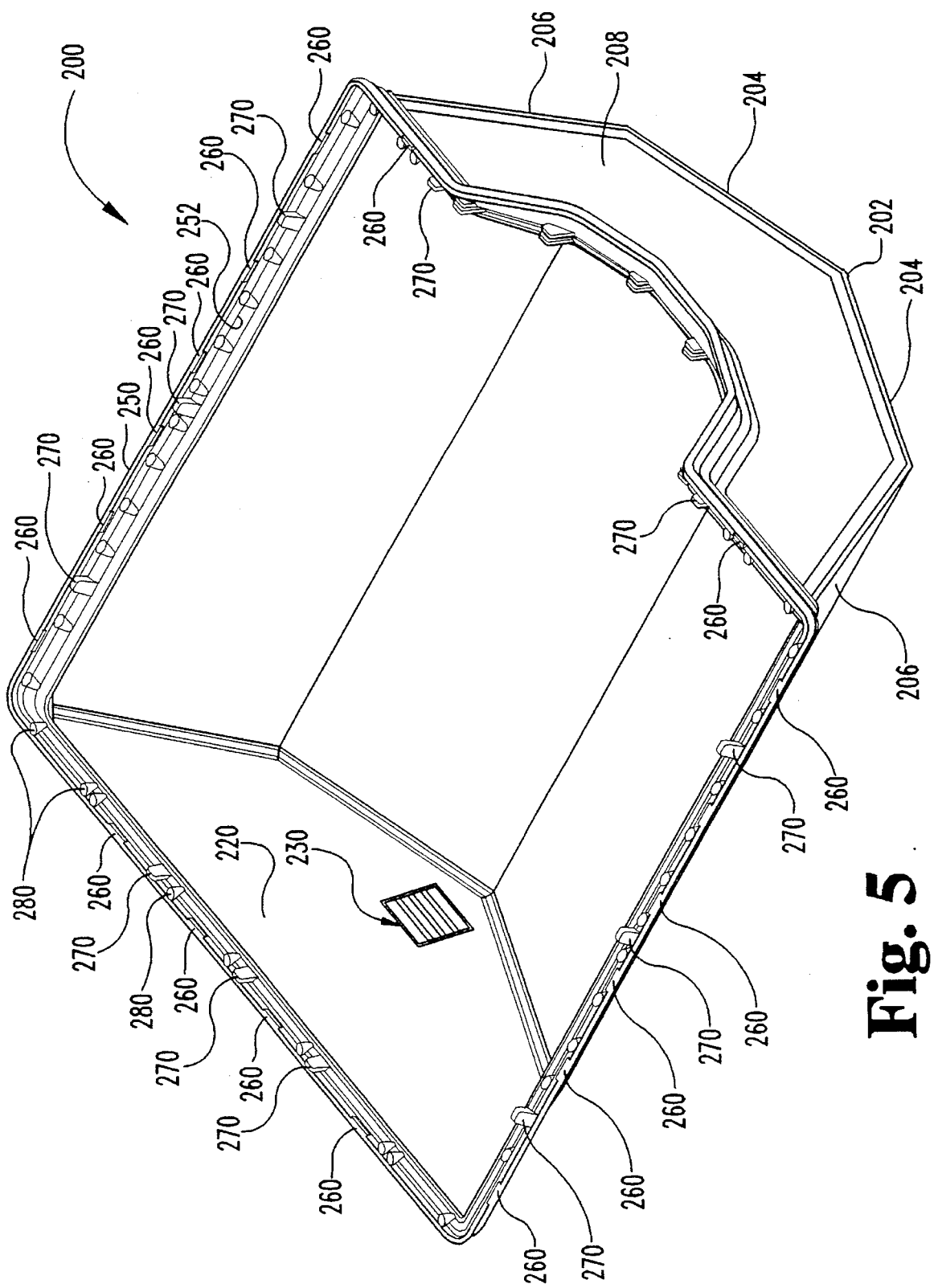
FIG. 5 is a perspective view of the inverted top portion of the embodiment of the present invention shown in FIG. 1.

Referring to FIG. 5, hollow top portion 200 includes an upper rim 250 which defines an open top end 252. This open top end 252 is generally opposite the closed end 202. Top portion 200 also has a rear top wall 220 joining sloped surfaces 204 and 206. Furthermore, the rear top wall 220 defines a louvered vent 230 therethrough. The louvered vent 230 provides for cross-ventilation in the two piece plastic animal shelter 10.

Figure 6:
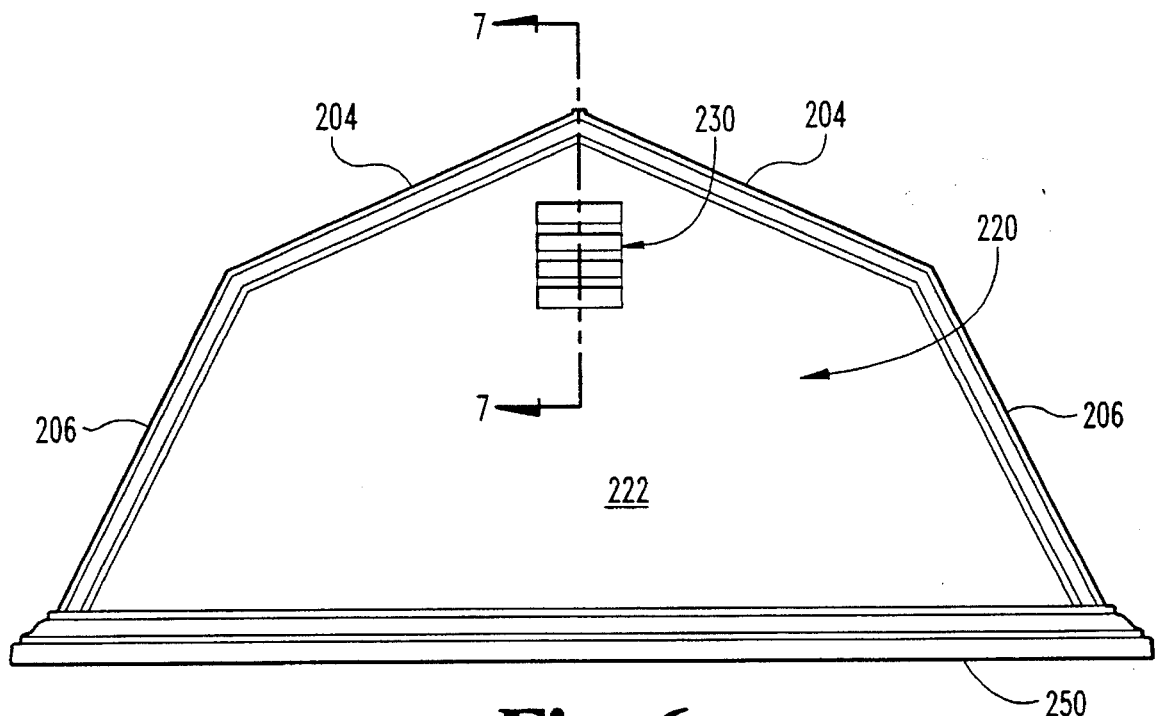
FIG. 6 is a rear elevational view of the top portion shown in FIG. 5.
Figure 7:
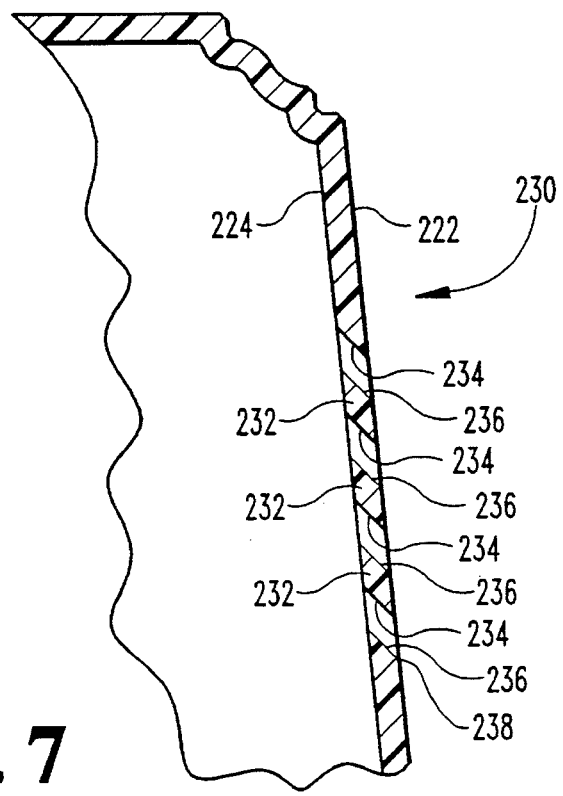
FIG. 7 is a partial cross-sectional view of the louvered vent shown in FIG. 6.

Referring to FIGS. 6 and 7, rear top wall 220 has an outer surface 222 exposed to the exterior environment and an inner surface 224 adjacent the interior of the enclosure and opposite the outer surface 222. Louvered vent 230 is shown integrally molded into top portion 200 with three generally parallel vanes 232 configured to define vent openings 234. Each vane 232 and the lower vent ledge 238 have a downward slanted upper surface 236. Referring specifically to FIG. 7, the downward slant of upper surface 236 is observed as the change in slope going from the inner surface 224 toward the outer surface 222. The downwardly slanted upper surfaces 236 shed precipitation and prevent the direct penetration of the interior by such precipitation. Similarly, the louvered vent 230 could be located in any wall of animal shelter 10 and still repel precipitation while maintaining cross-ventilation.

Figure 2:
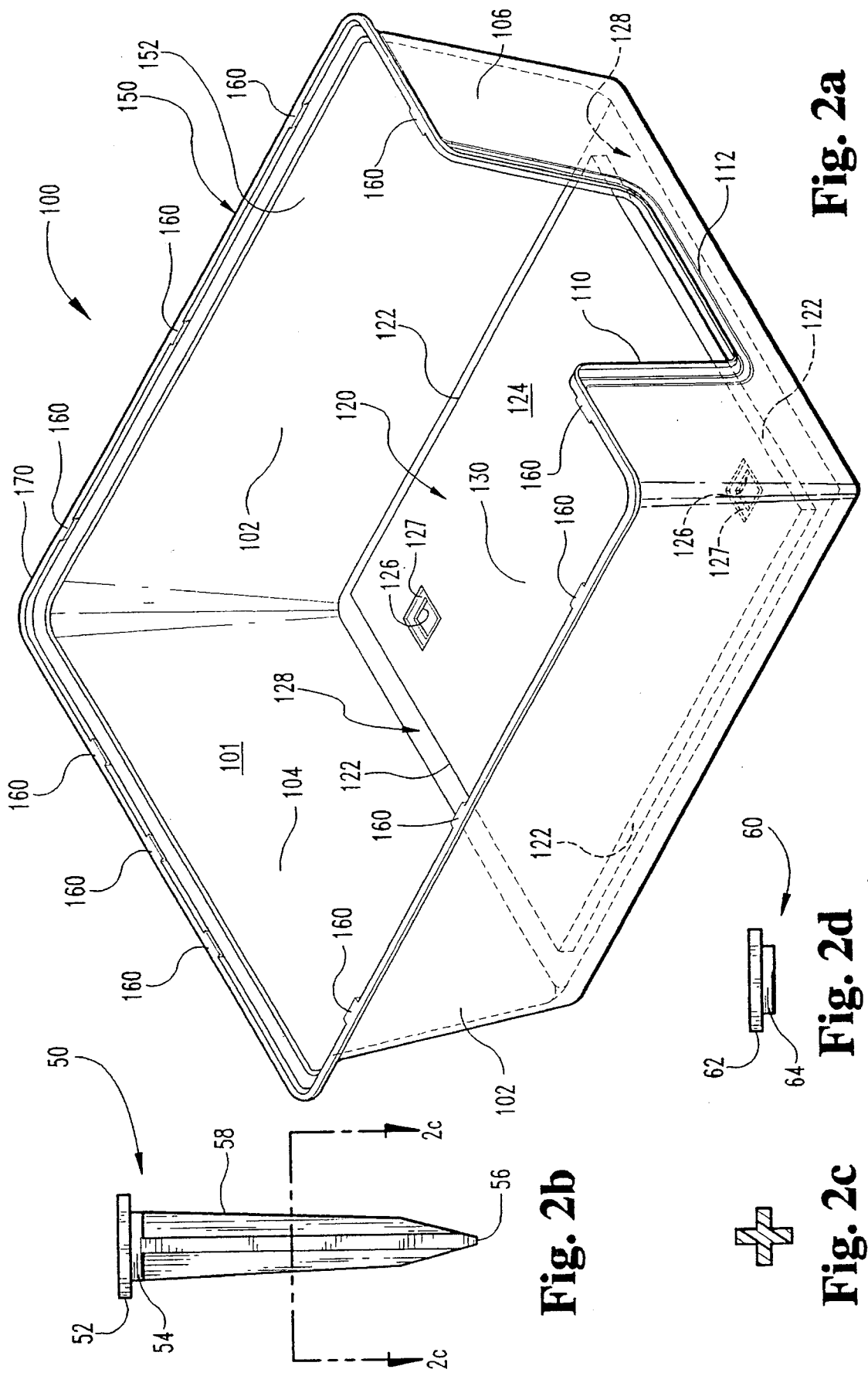

Having considered the various advantages of features disclosed in the base portion 100 and top portion 200, individually, the attachment of base portion 100 to top portion 200 is next disclosed. One preferred embodiment attaches the portions together without resort to additional parts or hardware by employing press-fit attachment members configured as connecting pairs. For each press-fit attachment pair, one member is integral with the base portion 100 and the corresponding member of the pair is integral with the top portion 200. Referring to FIG. 2, various press-fit attachment members are spaced along the lower rim 150 of base portion 100 as generally indicated by reference numbers 160 and 170. Similarly, FIG. 5 depicts press-fit attachment members spaced along the top portion 200 as generally indicated by reference numbers 260 and 270. In addition, it should be noted that top portion 200 also includes alignment cylinders 280 used to aid alignment of the upper rim 250 with the lower rim 150 during the attachment process. Alignment cylinders 280 may also be used to assist with the injection molding process of the top portion 100.

Figure 8:
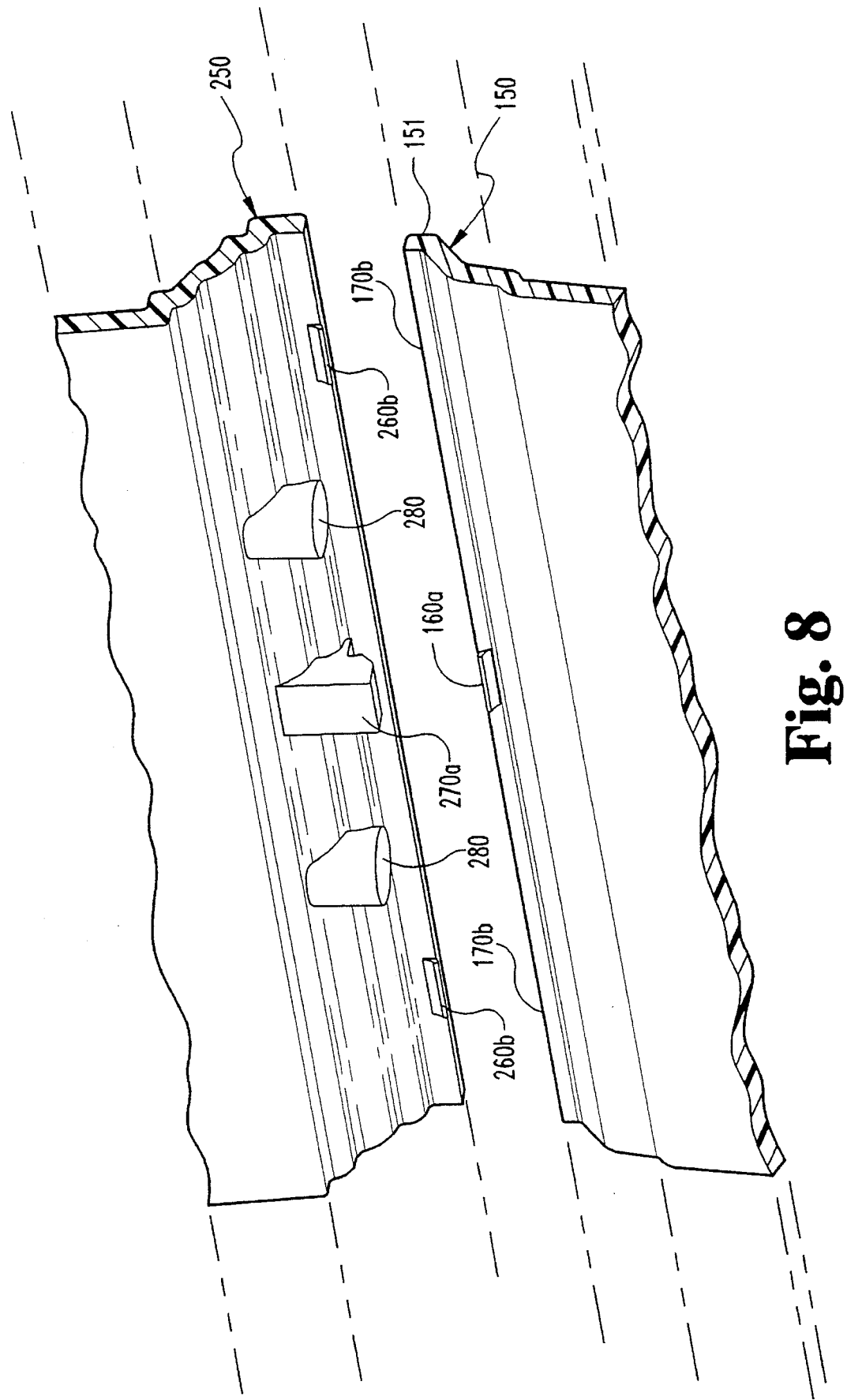
FIG. 8 is a partial perspective view from the interior of the base portion shown in FIG. 2 and the top portion shown in FIG. 5.

Referring to FIG. 8, two types of press-fit attachment pairs are detailed as seen in a perspective view prior to attachment from the interior of the enclosure. For one type of press-fit attachment pair, the lower rim 150 of base portion 100 includes a base tab 160a extending inwardly towards the interior of the shelter 10. Base tab 160a is the member of the pair integral with base portion 100. The corresponding pair member integral with top portion 200 is finger 270a extending downward from the top portion 200 in the vicinity of the upper rim 250.

Referring to FIG. 9, the connection of the 160a/270a press-fit attachment pair is depicted. It can be appreciated that finger 270a includes an outward surface 272a defining a groove 274a which receives base tab 160a for interlocking engagement.

Referring back to FIG. 8, another type of press-fit attachment pair is illustrated. The base portion 100 includes a base rim lip 151 extending continuously from the lower rim 150. A lip portion 170b provides the press-fit attachment member corresponding to the base portion 100 for this press-fit attachment pair. The corresponding top portion 200 member of this press-fit attachment pair is top tab 260b.

FIG. 10 provides a cross-sectional view of an attached 260b/170b press-fit attachment pair. It can be appreciated that top tab 260b defines a tab notch 264b which is configured to receive lip portion 170b in interlocking engagement.

Having described the structure of two types of press-fit attachment members, the method of attachment is next disclosed. With the base portion 100 resting on the ground, the upper rim 250 of top portion 200 is aligned with the lower rim 150 of the base portion 100 so that the rear base wall 104 is aligned with the rear top wall 220, front base wall 106 aligns with front top wall 208 and side walls 102 align with lower sloped surfaces 206. Once aligned, the press-fit attachment members integral with top portion 200 should rest on top of the corresponding press-fit attachment members integral with base portion 100.

Next, by pressing top portion 200 and base portion 100 together, each member of each press-fit attachment pair is pressed against the other. The resulting force causes lateral plastic deformation of at least one member of each press-fit attachment pair. This lateral plastic deformation permits groove 274a to receive base tab 160a as shown in FIG. 8. Similarly, the plastic deformation permits lip portion 170b to be received in tab notch 264b as shown in FIG. 9. Once the orientation of press-fit attachment members shown in FIGS. 8 and 9 is achieved, the base portion 100 and top portion 200 remain connected even after the pressing ceases. Thus, the connection of hollow base portion 100 to hollow top portion 200 defines an enclosed interior. Conversely, the base portion 100 and top portion 200 can be disconnected by pulling the base portion 100 and top portion 200 apart. The amount of force required to connect the base portion 100 and the top portion 200 is determined, among other things, by the number and arrangement of press-fit attachment members and the materials used to make those members.

Referring back to FIGS. 2 and 5, it can be appreciated that a number of press-fit attachment pairs are distributed along the lower rim 150 and upper rim 250 to provide a relatively uniform connection of the base portion 100 and top portion 200. In other embodiments, press-fit attachment pairs may be located only along selected walls of a multi-piece shelter. Alternatively, the base had 160a or top had 160b could be formed as a continuous flange. Similarly, the finger 270a could be configured as a continuous downward flange along one or more walls of the shelter. It can be appreciated that such alternative embodiments would affect the amount of force required to join the portions.

Besides integral press-fit attachment members, other means can be employed to join the base portion 100 and top portion 200. In such an alternative embodiment, one or more of the other features of the invention could be combined such as internal staking, a raised floor portion circumscribed by channel or a louvered vent molded into one or more walls of the shelter. Just as the press-fit attachment embodiment maintains the structure so that the roof is "openable", other methods could be used to provide connection and maintain openability. For example, an openable roof may be formed by a hinge connection of a roof configured top portion to a base portion. This hinge attachment may or may not be configured with other attachment means such as press-fit attachment member pairs discussed in previous embodiments.

Now referring back to FIG. 1, another aspect of the present invention is shown. Specifically, the base doorway perimeter 110 of base portion 100 and the top doorway perimeter 210 of top portion 200 defines a doorway 20. A door 30 is mounted in doorway 20. In this embodiment, door 30 includes a number of flexible plastic strips 32. Preferably, the strips 32 are made of a transparent plastic material.

Figure 11:
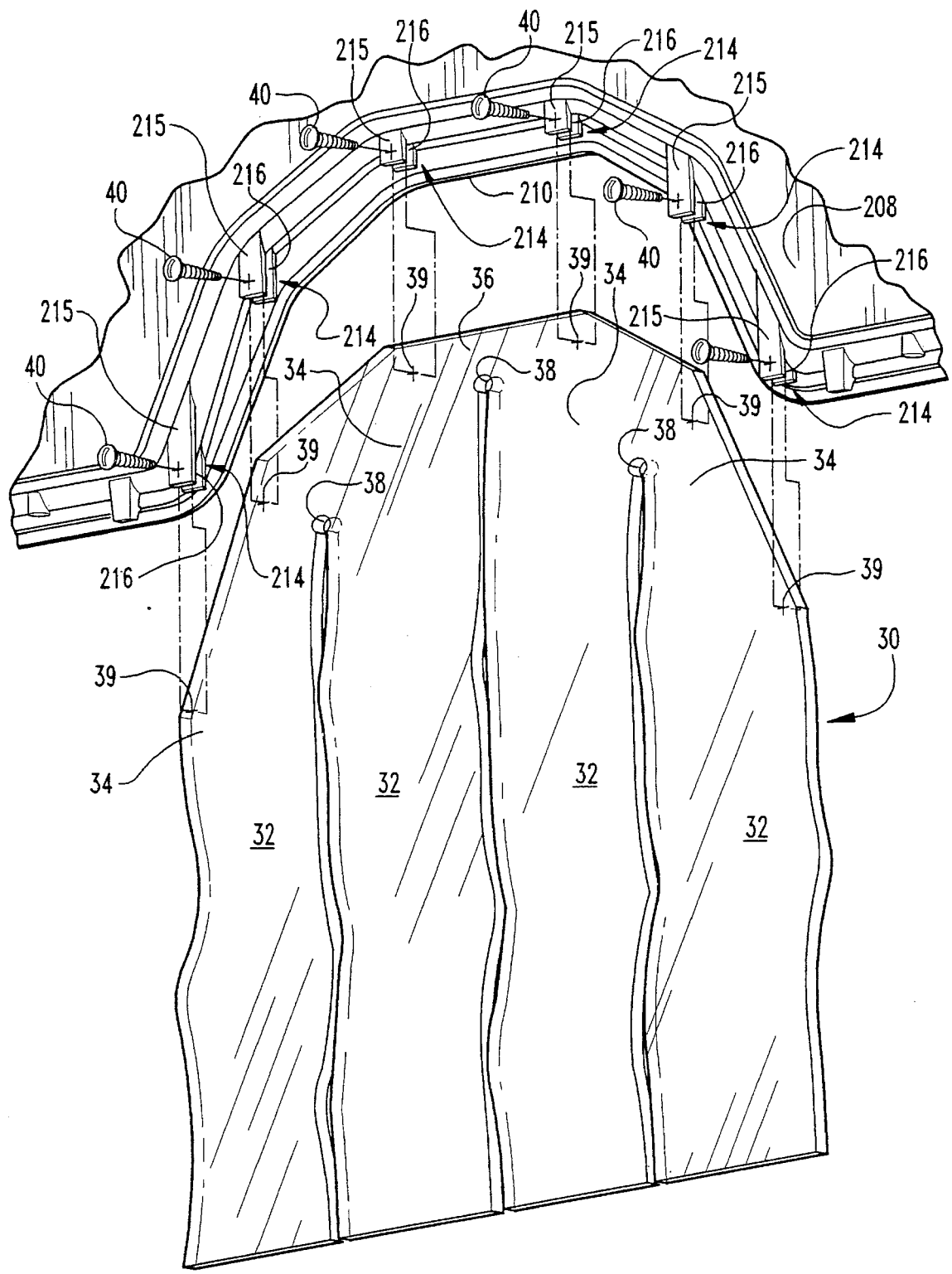
FIG. 11 is a partial exploded perspective view from the interior of the attachment of the door shown in FIG. 1.

Referring to FIG. 11, a partial exploded view of the interior of the front top wall 208 of the top portion 200 including door 30 is shown. It can be appreciated that the upper portion 34 of each strip 32 is interconnected to the other strips 32 via head 36 to form a unitary piece. Moreover, each strip 32 is adjacent to at least one other strip 32 forming an adjacent pair. Between the strips 32 of each adjacent pair, the interconnecting surface 37 of head 36 defines a circular hole 38 therethrough. This circular hole 38 provides stress relief for the flexing of the door 30 as the sheltered animal enters and exits the shelter 10.

The interior of front top wall 208 includes several pairs 214 of approximately parallel flange pairs 214 extending downward from top doorway perimeter 210. Each flange pair 214 defines a flange notch 216 between members of the pair. Flange notch 216 is configured to receive a connection portion 39 of head 36 therein.

Door 30 is mounted in flange notch 216 of each flange pair 214 by torquing a self-tapping screw 40 through the flange face 215 of each flange pair 214, then through the connection portion 39 received in notch 216 and preferably into the other flange of each flange pair 214. In alternative embodiments, numerous other door mounting means are envisioned as would occur to those of ordinary skill in the art.

Another aspect of the present invention is for the top portion 200 to be nestable within the base portion 100 for storage and transportation purposes. As illustrated in FIG. 2, the base portion 100 defines a chamber 101. The chamber 101 is configured to receive a substantial portion of the top portion 200, at least 70% by volume, when the top portion 200 is inverted so that the closed end 202 of top portion 200 enters the chamber 101 first. When the inverted top portion 200 is substantially contained in base portion 100, the top portion is "nesting" within the base portion 100. As a result, the volume occupied by the nesting orientation of the base portion 100 and top portion 200 during storage and transportation is approximately the same volume occupied by base portion 100 alone.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An animal housing comprising:

a hollow base portion having a lower rim;

a hollow top portion having an upper rim configured to align with said lower rim, said hollow top portion further configured for attachment to said base portion to define an enclosed interior;

a connected pair of press-fit attachment members, a first member of said pair being integral with said base portion and a corresponding second member of said pair being integral with said top portion; and, wherein said first member is a tab inwardly extending from said lower rim and said corresponding second member is a finger extending downward, said finger having an outward surface defining a groove configured to receive said tab for interlocking engagement.

2. The animal housing of claim 1 further comprising a plurality of connected pairs of press-fit attachment member pairs.

3. The animal housing of claim 2 wherein;

said top portion and said base portion form a multiplicity of walls when connected together, each wall being connected by said plurality of press-fit attachment pairs;

said plurality of press-fit attachment member pairs includes a plurality of first pairs, said first member of each of said plurality of said first pairs being formed by a portion of a continuous lip extending from said lower rim;

said plurality of press-fit attachment member pairs includes a plurality of second pairs, each of said plurality of said second pairs being generally spaced between said first pairs for at least each of two walls of said multiplicity of walls.

4. The animal housing of claim 3 wherein said base portion includes;

an interior surface formed approximately parallel to the ground, said interior surface defining a first opening therethrough;

a first stake configured to pass through said opening so that said animal housing is held in place when said first stake is driven into the ground through said first opening.

5. The animal housing of claim 4 wherein said interior surface further defines a second opening therethrough and a second stake configured to pass through said second opening.

6. The animal housing of claim 5 wherein said interior surface is formed by a thermoplastic floor configured for placement approximately parallel to the ground, said plastic floor surface including;

a raised portion having an upward surface elevated above the ground;

a channel adjacent said raised portion.

7. The animal housing of claim 6 wherein said multiplicity of walls include;

a first wall with a generally vertical portion;

said vertical portion having an outer surface exposed to the out-of-doors environment;

said vertical portion defining a louvered vent therethrough, said louvered vent having a plurality of approximately parallel vanes, each vane having an upper surface slanted downward toward said outer surface.

8. The animal housing of claim 7 wherein;

said base portion and said top portion are each molded as a single piece from a thermoplastic material;

said plurality of first pairs of press-fit attachment members is about eighteen and said plurality of second pairs of press-fit attachment members is about eleven;

said top portion includes;

a sloped surface for shedding rain;

said vertical portion defining said louvered vent;

said multiplicity of walls includes a second wall opposite said first wall, said second wall defining a doorway, said doorway further having;

a raised door lip to prevent the encroachment of water flowing on the ground;

a covered entry to impede the entry of rain a door mounted in said doorway, said door having:

adjacent vertical strips formed from a thermoplastic material;

each said strip with an upper portion interconnected to a head to form a unitary piece;

said channel of said thermoplastic floor circumscribes said raised portion and said channel is integrally formed between said raised portion and each of said multiplicity of walls;

said raised portion includes a downward surface opposite said upward surface, said downward surface being elevated above the ground and having about twelve support ribs radially arranged from approximately the center of said raised portion;

said first opening and said second opening are formed in said raised portion of said thermoplastic floor;

said top portion has a closed end opposite an open end, said open end being bordered by said upper rim;

said base portion defines a chamber configured to receive a substantial part of said top portion when said closed end of said top portion enters said chamber first, whereby said top portion is nestable within said base portion for storage purposes.

9. The animal housing of claim 1 wherein said base portion and said top portion are configured to define a doorway when connected together.

10. The animal housing of claim 9 further comprising a door mounted in said doorway.

11. The animal housing of claim 10 wherein said door includes a plurality of flexible plastic strips and each member of said plurality of flexible plastic strips hangs adjacent to at least one other member of said plurality of flexible plastic strips, said adjacent members forming an adjacent pair.

12. The animal housing of claim 11 wherein each member of said plurality of flexible plastic strips includes an upper portion, said upper portion of each member being interconnected with the others to form a unitary piece.

13. The animal housing of claim 12 wherein said unitary piece fines a circular hole between each member of said adjacent pair, said circular hole being formed just below a portion of said unitary piece interconnecting said adjacent pair.

14. The animal housing of claim 1 wherein;

said top portion has a closed end opposite an open end, said open end being bordered by said upper rim;

said base portion defines a chamber configured to receive a substantial part of said top portion when said closed end of said top portion enters said chamber first, whereby said top portion is nestable within said base portion for storage purposes.

15. The animal housing of claim 1 wherein said top portion and said base portion are molded from a thermoplastic material.

16. An animal housing that can be securely fastened to the ground, comprising:

a hollow top portion;

a hollow base portion configured for attachment to said top portion to define an enclosed interior;

said base portion being molded from thermoplastic and including an interior surface formed approximately parallel to the ground, said interior surface defining a preformed opening there through;

a stake configured to pass through said preformed opening and hold said animal housing in place when said stake is driven into the ground through said preformed opening, said stake being configured to engaged said interior surface to provide a generally uniform floor when said stake is positioned to hold said animal housing in place.

17. The animal housing of claim 16 herein said interior surface further defines a number of openings therethrough and includes a corresponding number of stakes, each of said number of stakes configured to correspondingly pass through one of said number of openings.

18. The animal housing of claim 16 wherein said interior surface is formed by a thermoplastic floor.

19. The animal housing of claim 18 wherein said thermoplastic floor includes;

a raised portion with an upward surface elevated above the ground;

a channel adjacent said raised portion.

20. The animal housing of claim 19 wherein;

said channel circumscribes said raised portion;

said interior surface defines a number of openings therethrough; and said number of openings are formed in said raised portion.

21. The animal housing of claim 16 wherein said top portion and said base portion are molded from a thermoplastic material.

22. The animal housing of claim 16 wherein;

said top portion has a closed end opposite an open end, said open end being bordered by said upper rim;

said base portion defines a chamber configured to receive a substantial part of said top portion when said closed end of said top portion enters said chamber first, whereby said top portion is nestable within said base portion for storage purposes.

23. The animal housing of claim 16 wherein said interior surface defines a recess surrounding said opening and said stake includes a head with a shoulder configured to engage said recess so that said stake engages said opening flush with said interior surface.

24. An animal housing, comprising:

an enclosure with a first wall, said first wall being formed from a thermoplastic material;

an openable roof portion;

said first wall having:

an outer surface exposed to the out-of-doors environment;

an inner surface opposite said outer surface, said inner surface being adjacent the interior of said enclosure;

said first wall defining a louvered vent therethrough, said louvered vent having a plurality of approximately parallel vanes, each vane having an upper surface slanted downward toward said outer surface; and wherein said wall and said louvered vent are molded as a single piece from thermoplastic and said vanes do not extend substantially past said outer surface.

25. The animal housing of claim 24 wherein said enclosure includes a second wall opposite said first wall, said second wall defining doorway therein.

26. The animal housing of claim 25 further comprising a door mounted in said doorway.

27. The animal housing of claim 24 wherein said plurality of vanes is about three.

28. The animal housing of claim 24 wherein said vanes do not extend substantially past said inner surface.

29. An animal housing comprising:

an enclosure with a thermoplastic floor for placement approximately parallel to the ground and a roof configured to shed precipitation, said enclosure being formed with a thermoplastic wall integrally connected to said floor and coupled to said roof;

said thermoplastic floor including:

a raised portion having an upward surface elevated above the ground and a downward surface opposite said upward surface, said downward surface being elevated above the ground, and a channel adjacent said raised portion and integrally formed between said raised portion and said wall.

30. The animal housing of claim 29 wherein said channel circumscribes said raised portion.

31. The animal housing of claim 29 wherein said thermoplastic floor includes 3 sides and said channel has a path along the perimeter of said plastic floor on at least 3 sides.

32. The animal housing of claim 31 wherein said floor defines an opening, and further comprising a stake configured to pass through the opening to hold the animal housing in place.

33. The animal housing of claim 32 wherein said raised portion generally dome-shaped to facilitate drainage of liquid on said raised portion to said channel.

34. The animal housing of claim 29 wherein said raised portion has a support rib integrally extending from said downward surface to contact the ground.

35. The animal housing of claim 34 wherein said raised portion has a plurality of said support ribs.

36. The animal housing of claim 35 wherein each of said plurality of support ribs extend radially from approximately the center of said raised portion.

37. The animal housing of claim 36 wherein said plurality is about 12.

38. The housing of claim 29 wherein said raised portion occupies more floor space than said channel.

39. The housing of claim 33 wherein said wall is generally vertical and molded to define a louvered vent therein.

* * * * *